US007831686B1

(12) United States Patent
Tran et al.

(10) Patent No.: US 7,831,686 B1
(45) Date of Patent: Nov. 9, 2010

(54) SYSTEM AND METHOD FOR RAPIDLY ENDING COMMUNICATION PROTOCOL CONNECTIONS IN RESPONSE TO NODE FAILURE

(75) Inventors: Cuong Huu Tran, Los Altos, CA (US); Bhavin K. Thaker, Sunnyvale, CA (US); Veeral P. Shah, Mumbai (IN)

(73) Assignee: Symantec Operating Corporation, Mountain View, CA (US)

( * ) Notice: Subject to any disclaimer, the term of this patent is extended or adjusted under 35 U.S.C. 154(b) by 1234 days.

(21) Appl. No.: 11/395,915

(22) Filed: Mar. 31, 2006

(51) Int. Cl.
*G06F 11/00* (2006.01)
*G06F 15/16* (2006.01)

(52) U.S. Cl. ........................ 709/217; 709/227
(58) Field of Classification Search .............. None
See application file for complete search history.

(56) References Cited

U.S. PATENT DOCUMENTS

| 6,393,581 | B1 * | 5/2002 | Friedman et al. ................ 714/4 |
| 7,076,555 | B1 * | 7/2006 | Orman et al. ................ 709/227 |
| 7,159,234 | B1 * | 1/2007 | Murphy et al. ................. 725/87 |
| 7,418,633 | B1 | 8/2008 | Salpekar et al. ............... 714/43 |
| 7,444,536 | B1 * | 10/2008 | Jairath ............................ 714/4 |
| 2002/0129146 | A1 | 9/2002 | Aronoff et al. .............. 709/225 |
| 2003/0028817 | A1 * | 2/2003 | Suzuyama et al. ............. 714/4 |
| 2003/0126315 | A1 | 7/2003 | Tan et al. ........................ 710/1 |
| 2003/0210651 | A1 | 11/2003 | Tzeng et al. ................. 370/231 |
| 2004/0042412 | A1 * | 3/2004 | Fan ............................. 370/252 |
| 2004/0153709 | A1 * | 8/2004 | Burton-Krahn ................ 714/4 |
| 2004/0268175 | A1 * | 12/2004 | Koch et al. ...................... 714/4 |
| 2005/0050392 | A1 * | 3/2005 | Baba et al. ..................... 714/25 |
| 2005/0071470 | A1 | 3/2005 | O'Brien et al. ............. 709/226 |
| 2005/0086342 | A1 * | 4/2005 | Burt et al. ................... 709/224 |
| 2005/0138461 | A1 * | 6/2005 | Allen et al. ..................... 714/4 |
| 2005/0144289 | A1 * | 6/2005 | Yoshiuchi et al. ........... 709/227 |
| 2005/0173645 | A1 * | 8/2005 | Endo ....................... 250/370.11 |
| 2005/0273645 | A1 * | 12/2005 | Satran et al. .................... 714/4 |
| 2006/0047836 | A1 * | 3/2006 | Rao et al. ................... 709/229 |
| 2006/0090097 | A1 * | 4/2006 | Ngan et al. ..................... 714/6 |
| 2006/0164974 | A1 * | 7/2006 | Ramalho et al. ............ 370/219 |
| 2006/0179147 | A1 * | 8/2006 | Tran et al. ................... 709/227 |
| 2006/0248213 | A1 * | 11/2006 | Sherer et al. ................ 709/231 |
| 2007/0198710 | A1 * | 8/2007 | Gopalakrishnan ........... 709/225 |
| 2008/0046971 | A1 * | 2/2008 | Swander ........................ 726/3 |
| 2008/0313274 | A1 * | 12/2008 | Murray et al. .............. 709/203 |
| 2009/0219805 | A1 * | 9/2009 | Appanna et al. ............ 370/219 |

OTHER PUBLICATIONS

Using Oracle Real Application Clusters (RAC) *DataDirectConnect for ODBC*, DataDirect Technologies, Jul. 2004, pp. 1-11.

(Continued)

*Primary Examiner*—Ricky Ngo
*Assistant Examiner*—Clemence Han
(74) *Attorney, Agent, or Firm*—Campbell Stephenson LLP

(57) ABSTRACT

Various methods and systems for ending a communication protocol connection in response to detecting the failure of a cluster node are disclosed. One method involves detecting a failed node within a cluster. The failed node communicates with a client via a communication protocol connection. In response to detecting the failed node, a communication protocol message is sent to the client. Receipt of the communication protocol message causes the client to terminate the communication protocol connection.

7 Claims, 5 Drawing Sheets

OTHER PUBLICATIONS

"Client Failover Best Practices for Highly Available Oracle Databases: Oracle Database 10g Release 2," *Oracle Maximum Availability Architecture White Paper*, Mar. 2006, pp. 1-23.

Lorenzo Alvisi et al., "Wrapping Server-Side TCP to Mask Connection Failures," from Proc. IEEE INFOCOM, Anchorage, Alaska, 2001, pp. 1-9.

Navid Aghdaie et al., "Client-Transparent Fault-Tolerant Web Service," from 20th IEEE International Performance Computing and Communications Conference, Phoenix, Arizona, 2001, pp. 209-216.

Navid Aghdaie et al., "Implementation and Evaluation of Transparent Fault-Tolerant Web Service with Kernel-Level Support," from 11th IEEE International Performance Computer Communications and Networks Conference, Miami, Florida, Oct. 2002, No. 63-68.

Werner Almesberger, "TCP Connection Passing," Proceedings of the Linux Symposium, vol. One, Jul. 21-24, 2004, Ottawa, Ontario Canada, pp. 1-16.

Navid Aghdaie et al. "Fast Transparent Failover for Reliable Web Service," from Proc. 15th IASTED International Conference on Parallel and Distributed Computing and Systems (PDCS), Marina Del Ray, California, Nov. 2003, pp. 1-6.

Tran et al., pending U.S. Patent Application entitled "System And Method for Maintaining Communication Protocol Connections During Failover," U.S. Appl. No. 11/397,059; Non-Final Office Action, mail date Mar. 18, 2009, 17 pages.

\* cited by examiner though the drawings and
detailed description are not intended to limit the invention to
the particular form disclosed. Instead, the intention is to cover
all modifications, equivalents and alternatives falling within
the spirit and scope of the invention as defined by the
appended claims.

SYSTEM AND METHOD FOR RAPIDLY ENDING COMMUNICATION PROTOCOL CONNECTIONS IN RESPONSE TO NODE FAILURE

FIELD OF THE INVENTION

This invention relates to computing systems and, more particularly, to clustered computing systems.

DESCRIPTION OF THE RELATED ART

When a node that is participating in a communication protocol connection fails, a significant amount of time may elapse before another application that is communicating via the connection detects the failure and ends the connection. During this period of time, the non-failed application will not be able to communicate with the application that was executing on the failed node. Accordingly, performance of the non-failed application may be adversely affected. Until the non-failed application detects the failure, the non-failed application will not be able to take actions (e.g., such as attempting to connect with another instance of the application on another node) that would improve performance. Thus, it is desirable to reduce the amount of time that elapses between the time at which a node fails and the time at which the connection in which that node is participating is terminated.

SUMMARY

Various embodiments of methods and systems for ending a communication protocol connection in response to detecting the failure of a cluster node are disclosed. One method involves detecting a failed node within a cluster. The failed node communicates with a client via a communication protocol connection. In response to detecting the failed node, a communication protocol message is sent to the client. Receipt of the communication protocol message causes the client to terminate the communication protocol connection.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
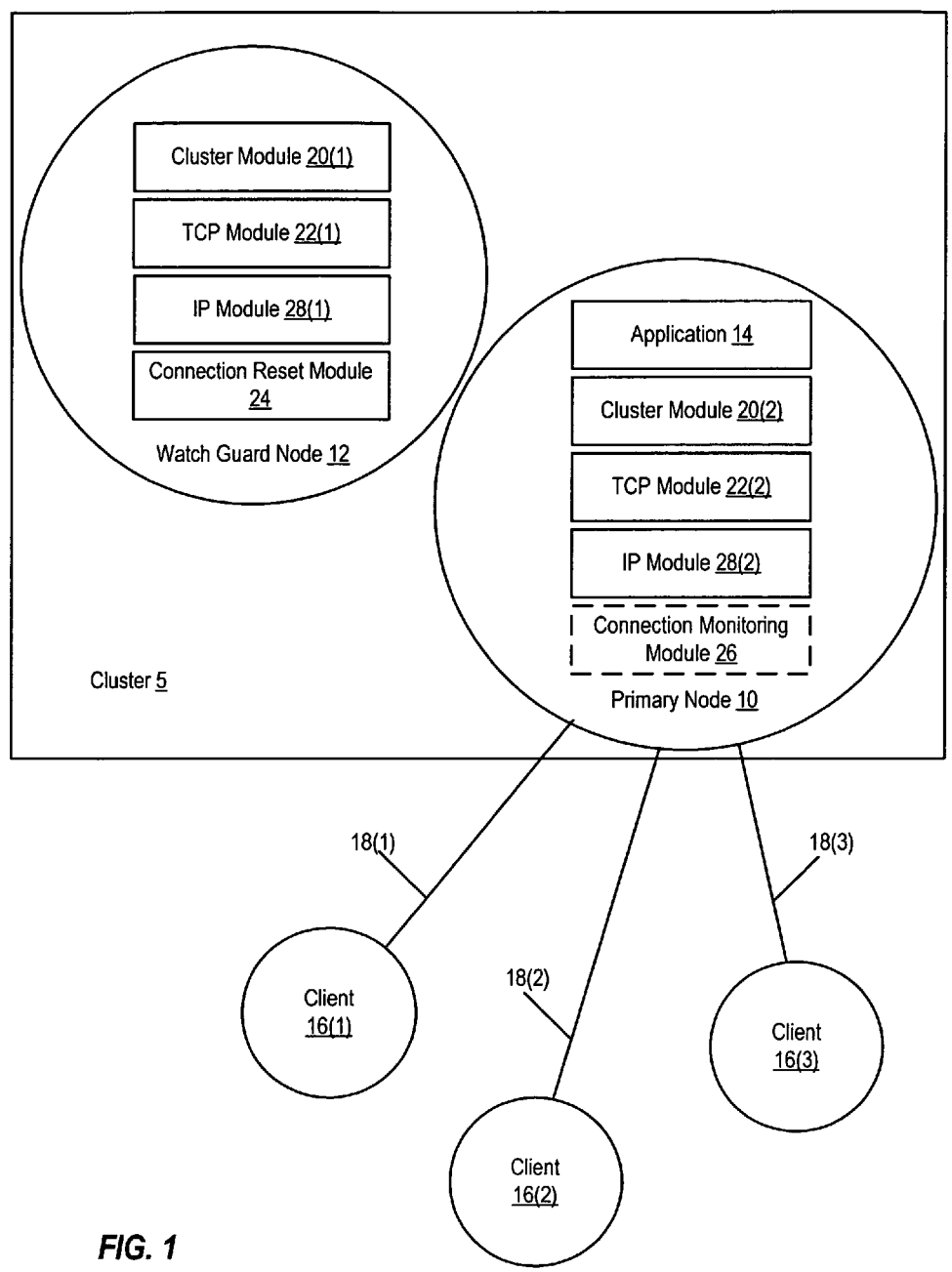
FIG. 1 is a block diagram of a cluster, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

According to the present invention, one node within a cluster operates as a primary node while another node within the cluster operates as a watch guard node. An application executing on the primary node establishes a communication protocol connection with a client. If the primary node fails, the cluster will detect the failure and notify the watch guard node. In response to detecting the failure of the primary node, the watch guard node will cause the client to terminate the connection. Accordingly, the connection is promptly terminated after failure of the primary node, allowing the client to begin recovering from the failure (e.g., by connecting to another server and/or purging a local cache) sooner than if the client had waited for the connection to timeout before terminating the connection.

FIG. 1 is a block diagram of a cluster 5. Cluster 5 includes a primary node 10 and a watch guard node 12. While only two nodes are shown in this example, it is noted that cluster 5 can have more than two nodes.

An application 14 executes on primary node 10. Several clients 16(1)-16(3) have established respective communication protocol connections 18(1)-18(3) with application 14. Clients 16(1)-16(3) can be coupled to cluster 5 via a WAN (Wide Area Network), such as the Internet, one or more LANs (Local Area Networks), one or more wireless networks, and the like. While three clients are shown in the example of FIG. 1, it is noted that a given cluster node can communicate with fewer or additional clients in other embodiments.

Primary node 10 and watch guard node 12 are coupled to communicate with each other by one or more networks. For example, primary node 10 and watch guard node 12 can be coupled by one or more private networks. Additionally, primary node 10 and watch guard node 12 can be coupled by one or more LANs and/or WANs. Private network(s) can be used to communicate cluster-specific messages, such as heartbeat messages and messages used to determine cluster membership, among the nodes within cluster 5.

Watch guard node 12 implements a cluster module 20(1), a Transmission Control Protocol (TCP) module 22(1), and a connection reset module 24. Primary node 10 similarly implements a cluster module 20(2) and a TCP module 22(2), as well as a connection monitoring module 26 (as indicated by the dashed lines, connection monitoring module 26 is optional and may not be included in some embodiments). Watch guard node 12 and primary node 10 also implement respective Internet Protocol (IP) modules 28(1) and 28(2).

In some embodiments, application 14 is a file system or database. For example, application 14 can be a backend application that provides access to data for a set of application servers, which act as clients 16(1)-16(3) of application 14. In general, application 14 is an application that communicates with one or more clients via respective communication protocol connections, such as connections 18(1)-18(3). In some embodiments, connections 18(1)-18(3) are TCP connections.

Cluster modules 20(1) and 20(2) each implement clustering software, such as VERITAS Cluster Server™, available from Symantec Corporation of Cupertino, Calif. Each cluster module 20(1) and 20(2) is able to identify which nodes are currently members of cluster 5. Additionally, clustering modules 20(1) and 20(2) are able to detect changes in cluster membership due to nodes leaving (e.g., due to failure) or joining cluster 5. In one embodiment, clustering modules within each node in cluster 5 exchange heartbeat messages via a private network that provides a low-latency transport mechanism. The private network can be implemented, for example, using a non-IP-based Ethernet network. The exchanged heartbeat messages (or lack thereof) can be used to rapidly determine the current cluster membership.

TCP modules 22(1) and 22(2) are examples of communication protocol modules that implement a communication protocol (TCP in the example of FIG. 1). IP modules 28(1) and 28(2) provide each node with the ability to communicate over an IP-based network (e.g., a network coupling cluster 5 to clients 16(1)-16(3). TCP modules 22(1) and 22(2) and IP modules 28(1) and 28(2) can be implemented in hardware and/or software. Additionally, TCP modules 22(2) may be integrated with application 14. It is noted that primary node 10 and watch guard node 12 can implement communication protocols other than TCP (i.e., TCP modules 22(1) and 22(2) can be replaced with modules implementing other communication protocols) in other embodiments.

TCP module 22(2) can establish a respective connection with each of clients 16(1)-16(3). Connections are established by exchanging information (e.g., such as a port number) and acknowledgements with a TCP module (not shown) implemented on each client 16(1)-16(3). Once a connection to each client is established, application 14 can use the established connections to communicate with clients 16(1)-16(3). Application 14 can send and receive TCP messages by interacting with TCP module 22(2). TCP module 22(2) can encapsulate data generated by application 14 into TCP messages, which are then passed to IP module 28(2) for transmission via an IP-based network to clients 16(1)-16(3).

Connection reset module 24 is configured to initiate termination of any connections that have been established between primary node 10 and clients 16(1)-16(3) in the event that primary node 10 fails. Connection reset module 24 is configured to communicate with cluster module 20(1) in order to detect changes in cluster membership. If cluster module 20(1) detects the failure of primary node 10, connection reset module 24 sends a message to each client that currently has a connection open to primary node 10. Receipt of the message (e.g., a TCP Reset (RST) message) causes the recipient to terminate the client.

Each message sent by connection reset module 24 to terminate an open connection to primary node 10 contains connection parameters that identify the connection to be terminated. For example, for a TCP connection, the message can include a TCP port (identifying a port on primary node 10), a TCP window size, a sequence number, a timestamp, and the like. Since the message includes these connection-specific parameters, the message will be handled (by the receiving client) as a valid TCP message, as if the message was sent by primary node 10. Accordingly, the receiving client will terminate the connection according to existing TCP procedures. Once the receiving client has terminated the connection, the client can attempt to reconnect to another instance of application 14 on another device. For example, if application 14 is a network file system (NFS) implemented in a parallel NFS arrangement, the client can attempt to connect to another instance of the NFS.

In some embodiments, connection monitoring module 26 on primary node 10 is configured to provide information to connection reset module 24. The information identifies the connections that have been established between application 14 on primary node 10 and clients 16(1)-16(3). A connection can be identified by the IP address of application 14, the IP address of the client using that connection, a TCP port used by application 14, and a TCP port used by the client when communicating via the connection. The identified connections will be reset (by connection reset module 24) if primary node 10 fails. Each time that primary node 10 establishes a new connection or terminates an existing connection, connection monitoring module 26 can send an updated set of information to connection reset module 24. In one embodiment, both connection monitoring module 26 and connection reset module 24 are implemented at a software layer below the IP layer on primary node 10 and watch guard node 12 respectively.

Connection reset module 24 can obtain the appropriate connection parameters for each open connection to primary node 10 in a variety of different ways. In some embodiments, connection reset module 24 obtains the connection parameters after detecting that primary node 10 has failed. In these embodiments, obtaining the connection parameters involves failing over the IP address, which was used by application 14 executing on primary node 10 prior to the node's failure, to watch guard node 12 and then having watch guard node 12 query each client (e.g., using a TCP window probe message) for the current connection parameters using the failed-over IP address. The IP address can be a "virtual" IP (VIP) address that is capable of migrating from one physical device to another.

Connection reset module 24 (or another component of watch guard node 12, such as cluster module 20(1)), can initiate the IP address failover in response to detecting that primary node 10 is failed. Once the IP address has failed over to watch guard node 12, connection reset module 24 causes watch guard node 12 to request current connection parameters (e.g., using a probe message) from each client that has established a connection to primary node 10. When a response is received from a client, connection reset module 24 can extract and save the connection parameters corresponding to the connection to that client. For example, when a response is received from client 16(2), connection reset module 24 can extract the parameters in that response and associate the parameters with connection 18(2). These parameters can then be used to initiate termination of connection 18(2). If connection reset module 24 does not have information identifying which clients actually have established connections to the primary node, connection reset module 24 can request the parameters from each client that potentially has a connection to the failed primary node.

In other embodiments, instead of waiting for primary node 10 to fail before obtaining the connection parameters, watch guard node 12 obtains the connection parameters while primary node 10 is still operating. In these embodiments, connection monitoring module 26 within primary node 10 is configured to provide connection parameters to watch guard node 12. For example, connection monitoring module 26 can send messages containing the connection parameters (e.g., by forwarding copies of the communication protocol messages sent via each connection 18(1)-18(3)) to connection reset module 24 of watch guard node 12. Alternatively, connection monitoring module 26 can store copies of the connection parameters in a storage location that is also accessible to watch guard node 12 (e.g., such as a shared storage device coupled to cluster 5). Connection reset module 24 can then routinely (e.g., periodically or in response to prespecified stimuli) obtain the connection parameters by reading the connection parameters from this shared storage location.

In still other embodiments, connection monitoring module 26 reroutes at least some of the communication protocol messages being sent via each connection to watch guard node 12, and connection reset module 24 extracts the connection parameters from these rerouted messages. In one embodiment, connection monitoring module 26 reroutes all communication protocol messages being sent via the connections 18(1)-18(3) through watch guard node 12.

In other embodiments, connection monitoring module 26 reroutes some, but not all, of the communication protocol messages being sent via connections 18(1)-18(3) to watch guard node 12. For example, if the communication protocol is TCP, connection monitoring module 26 can reroute a message to watch guard node 12 once every few seconds. In such embodiments, at any given time, connection reset module 24 may not have the most current values of the parameters. However, connection monitoring module 26 can forward messages frequently enough that the parameters are likely to still be valid. For example, if TCP is being used as the communication protocol, connection monitoring module 26 can forward messages frequently enough that the parameter values obtained by connection reset module 24 can still be used to generate a reset message that, from the perspective of the corresponding client, is within a valid reception window and will not be outdated.

When all or some of the communication protocol messages being sent via a particular connection are forwarded to watch guard node 12, the connection is (at least temporarily) rerouted through watch guard node 12. However, from the perspective of the client at the other end of that particular connection, all communication protocol messages are received from and sent to the primary node 10.

When communication protocol messages are rerouted through watch guard node 12 by primary node 10, watch guard node 12 receives the communication protocol messages, extracts the connection parameters, and rewrites the communication protocol messages for transmission to the appropriate client. In some embodiments, a special message type or protocol type (e.g., indicated by the value of a protocol type field within the IP header of the message) is included within the version of the message sent from primary node 10 to watch guard node 10. Messages that include that special protocol type will be processed by connection reset module 24 (e.g., the inclusion of that special protocol type within the IP header of a message can trigger connection reset module 24 to process the message). In one embodiment, connection reset module 24 includes an IP filter driver that detects messages having the special protocol type.

As an example of the manner in which a communication protocol message being sent from primary node 10 to client 16(1) via connection 18(1) can be rerouted through watch guard node 12, primary node 10 can insert the destination Media Access Control (MAC) address of watch guard node 10 into the message and set the protocol type field in the IP header of the message to a value identifying a special protocol. These two pieces of information respectively cause the message to be sent to watch guard node 12 and processed by connection reset module 24. Connection reset module 24 can then extract the connection parameters from the message, rewrite the destination MAC address to identify the MAC address of a common gateway router (used to convey messages from primary node 10 to clients 16(1)-16(3)), and rewrite the protocol type field to identify the appropriate protocol (e.g., TCP). As a result, after being rewritten, the message will be sent to client 16(1). The other fields (e.g., source IP address) within the message will indicate that the message was sent by primary node 10.

Thus, connection reset module 24 can obtain connection parameters for each connection established between primary node 10 and clients 16(1)-16(3) in a variety of different ways, including extracting the parameters from messages that, while being conveyed to clients 16(1)-16(3) via connections 18(1)-18(3), are rerouted through watch guard node 12. Once the current connection parameters are obtained, connection reset module 24 can initiate the termination of connections 18(1)-18(3) if primary node 10 fails. To terminate the connections in response to detecting the failure of primary node 10, watch guard node 12 can generate a message, which contains some of the parameters (or information derived from the parameters, such as a sequence number generated by incrementing or decrementing a parameter), and send that message to the client. The message is a type of message, such as a TCP reset message, that causes the receiving client to terminate the connection identified in the message.

Since cluster module 20(1) is configured to detect that primary node 10 is failed much more quickly (after the failure) than, for example, clients 16(1)-16(3) can detect the failure (e.g., using TCP timeout mechanisms), connection reset module 24 can, in some situations, cause the open connections to primary node 10 to be terminated much more quickly than those connections would otherwise be terminated. Accordingly, connections are terminated in response to changes in cluster membership detected by a cluster server (which can typically be detected in less than a minute or even a few seconds, depending upon the implementation), and are not terminated based on timeouts, which can take several minutes or even hours to occur, especially if the communication protocol has entered an exponential back-off period in which exponentially increasing delays are inserted between successive messages. Additionally, since the termination of each connection is initiated in response to reception a conventional message, clients 16(1)-16(3) may not need to be modified to handle the termination-causing messages sent by connection reset module 24. Furthermore, clients benefit from rapid connection termination in response to cluster failures detected by cluster module 20(1) without needing to interface to the clustering software implemented on cluster 5 (i.e., the clients do not need to have an interface to the cluster modules implemented on each node in cluster 5).

In some embodiments, cluster 5 includes more than two nodes. In such an embodiment, if watch guard node 12 fails, cluster 5 can fail connection reset module 24 over to another node (or otherwise configure another node as a new watch guard node). Cluster module 20(1) can detect the failure of watch guard node 12 and notify connection monitoring module 26, which can then begin sending information identifying the established connections to the new watch guard node. Additionally, it is noted that watch guard node 12 can act as a watch guard (i.e., a node that will reset connections on behalf of another node if the other node fails) for multiple primary nodes.

Each client 16(1)-16(3), as well as primary node 10 and watch guard node 12 (collectively referred to as nodes 10 and 12), can include one or more computing devices configured to execute software implementing various applications (e.g., an application server, a database application, a file system, a volume manager, or the like). Computing devices can include workstations, personal computers, servers, PDAs (Personal Digital Assistants), cell phones, storage network switches, storage devices, storage array controllers, or any other devices configured to execute software implementing such applications. Alternatively, clients 16(1)-16(3) and/or nodes 10 and 12 can be implemented from one or more logic devices (e.g., PLDs, FPGAs, and the like) configured to perform the functions of such applications. Clients 16(1)-16(3) and/or nodes 10 and 12 can also be implemented using logic devices that are configured to perform some of the functions of the applications and that are also configured to execute software implementing other functions of the applications.

Additionally, in some embodiments, several nodes and/or clients are implemented in a single physical computing device. For example, a multiprocessor computer system can be subdivided into several virtual machines, each of which is used to implement one of the nodes 10 and 12 in cluster 5. A single physical computing device can also implement both a client and a node.

Figure 2:
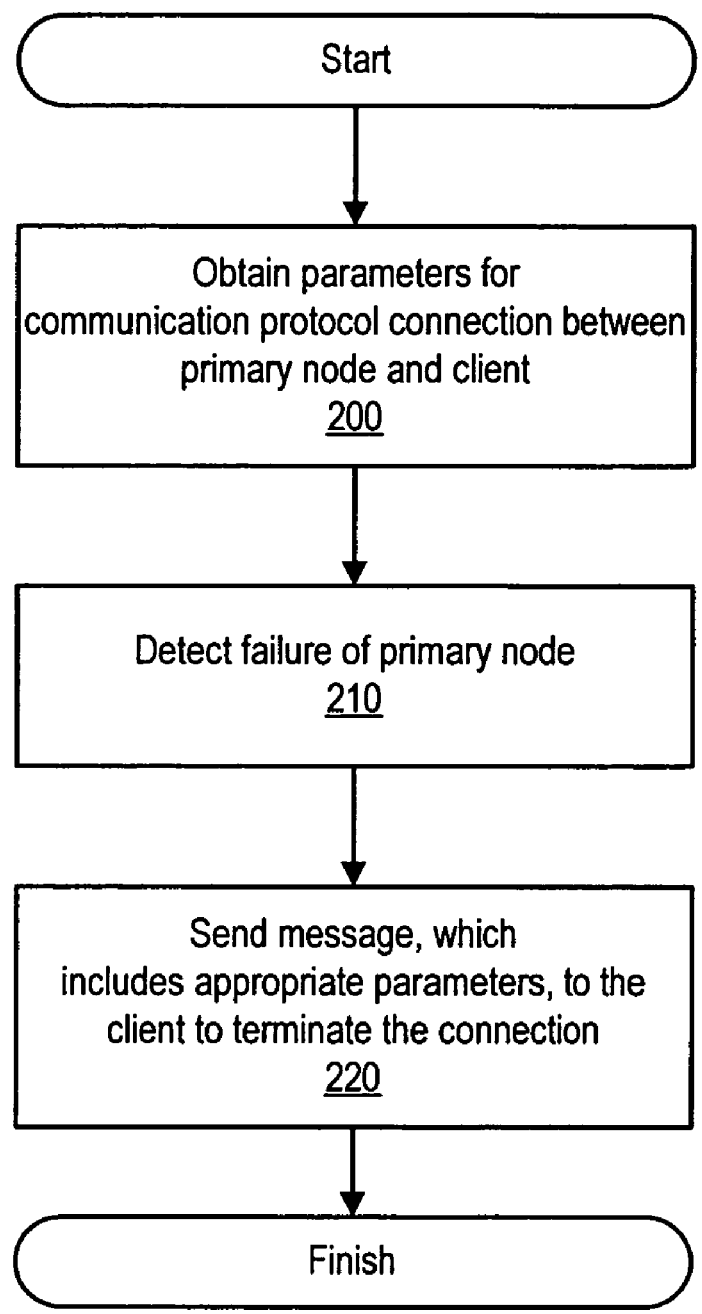
FIG. 2 is a flowchart of a method of terminating a communication protocol connection in response to detecting a failed node within a cluster, according to one embodiment of the present invention.

FIG. 2 is a flowchart of a method of terminating a communication protocol connection in response to detecting a failed node within a cluster. This method can be performed by a watch guard node, such as watch guard node 12 of FIG. 1. At 200, the parameters for a communication protocol connection between a primary node and a client are obtained. The parameters are dynamic parameters that change over time (e.g., such as timestamps, communication window sizes, sequence numbers, and the like). These parameters can be obtained in a variety of different ways. For example, the parameters can be received directly from the primary node, read from a storage device to which access is shared by the primary node, extracted from messages being sent via the connection, or extracted from a probe response received from the client.

At 210, failure of the primary node is detected. The failure is detected using clustering techniques (e.g., such as those used to detect changes in cluster membership). It is noted that failure of the primary node can be detected before or after the connection parameters are obtained at 200.

At 220, a message, which includes appropriate parameters, is sent to the client. Receipt of the message causes the client to terminate the connection to the primary node. The message can be, for example, a TCP reset message. The parameters can include window sizes, sequence numbers, and/or timestamps that are derived from the parameters obtained at 200. For example, a timestamp obtained at 200 can be increased by an appropriate amount (relative to the time elapsed since the timestamp was obtained) and the increased timestamp can be included in the message sent at 220. Similarly, a sequence number obtained at 200 can be incremented and included in the message sent at 220.

Figure 3:
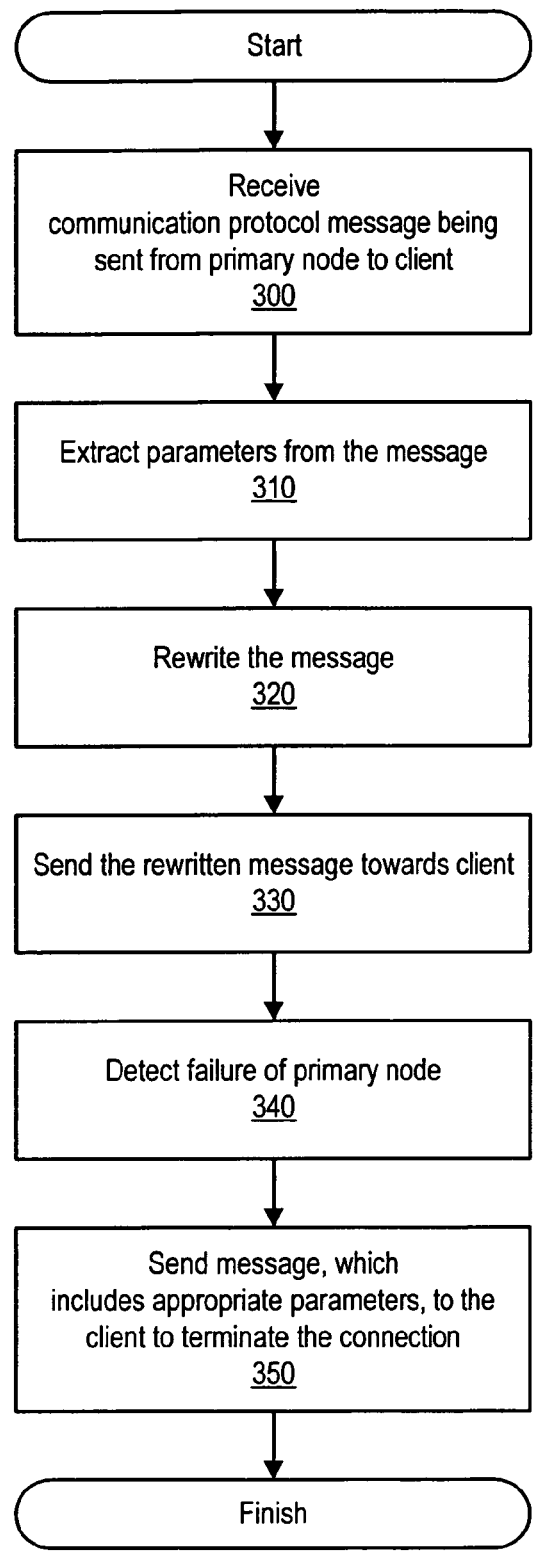
FIG. 3 illustrates another method of terminating a communication protocol connection in response to detecting a failed node within a cluster, according to another embodiment of the present invention.

FIG. 3 illustrates another method of terminating a communication protocol connection in response to detecting a failed node within a cluster. This method can be performed by a watch guard node, such as watch guard node 12 of FIG. 1. In this embodiment, connection parameters are obtained by extracting the parameters from messages that are being sent via the connection.

The method begins at 300, when a communication protocol message (e.g., a TCP message) being sent from the primary node to the client via the connection is received. The connection parameters (e.g., timestamps, window sizes, and/or sequence numbers) are extracted from the message, as shown at 310, and stored.

The message is then rewritten for transmission to the client, as shown at 320. Rewriting the message can involve rewriting a protocol type field as well as a destination address field (e.g., to specify a common gateway used to send messages to the client). The rewritten message is then sent to the client, as shown at 330.

At 340, failure of the primary node is detected. In response, a message, which includes appropriate connection parameters that have been derived from the parameters obtained at 310, is sent to the client. Receipt of the message causes the client to terminate the connection.

Figure 4:
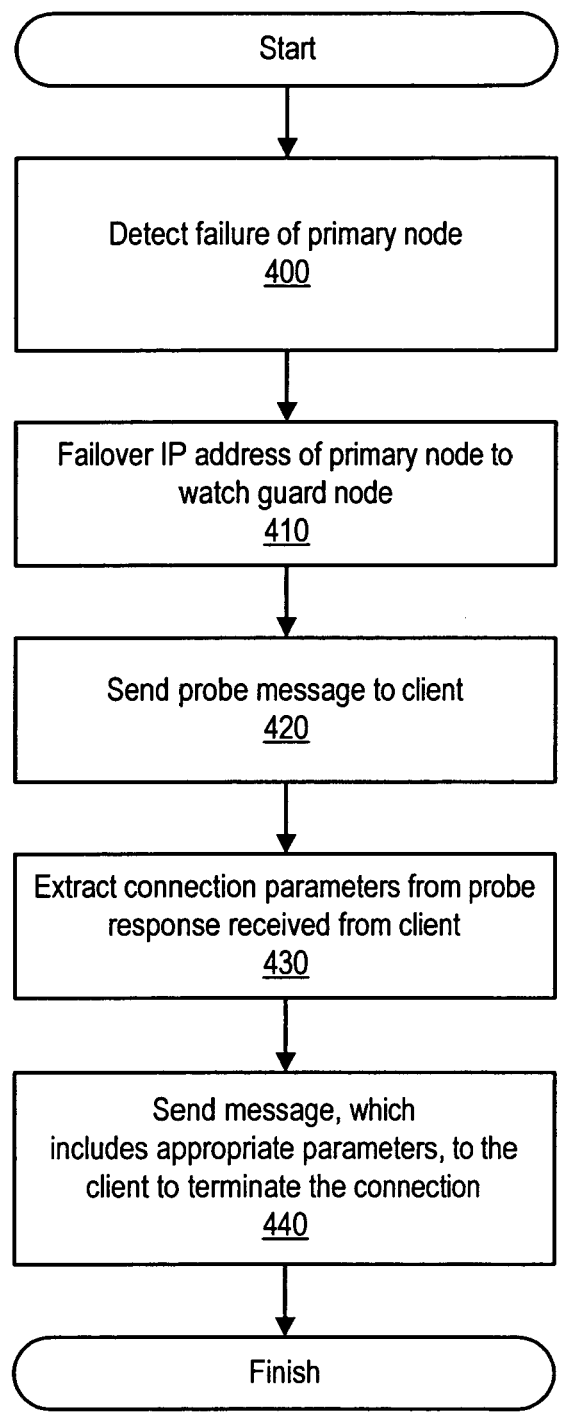
FIG. 4 illustrates another method of terminating a communication protocol connection in response to detecting a failed node within a cluster, according to yet another embodiment of the present invention.

FIG. 4 illustrates another method of terminating a communication protocol connection in response to detecting a failed node within a cluster. This method can be performed by a watch guard node, such as watch guard node 12 of FIG. 1. In this embodiment, connection parameters are obtained after the failure of the primary node is detected.

At 400, the failure of the primary node is detected. At the time of its failure, the primary node had established a connection with a client. At 410, an IP address of the primary node is failed over to the watch guard node. Once the IP address has failed over, the watch guard node sends a probe message, which requests current parameters for the connection, to the client. The client responds by sending a probe response.

At 430, the connection parameters are extracted from the probe response. These parameters are used to derive new parameters (e.g., by increasing a time stamp or incrementing a sequence number). The new parameters are included in a message that is sent to the client at 440. The message instructs the client to terminate the connection.

Figure 5:
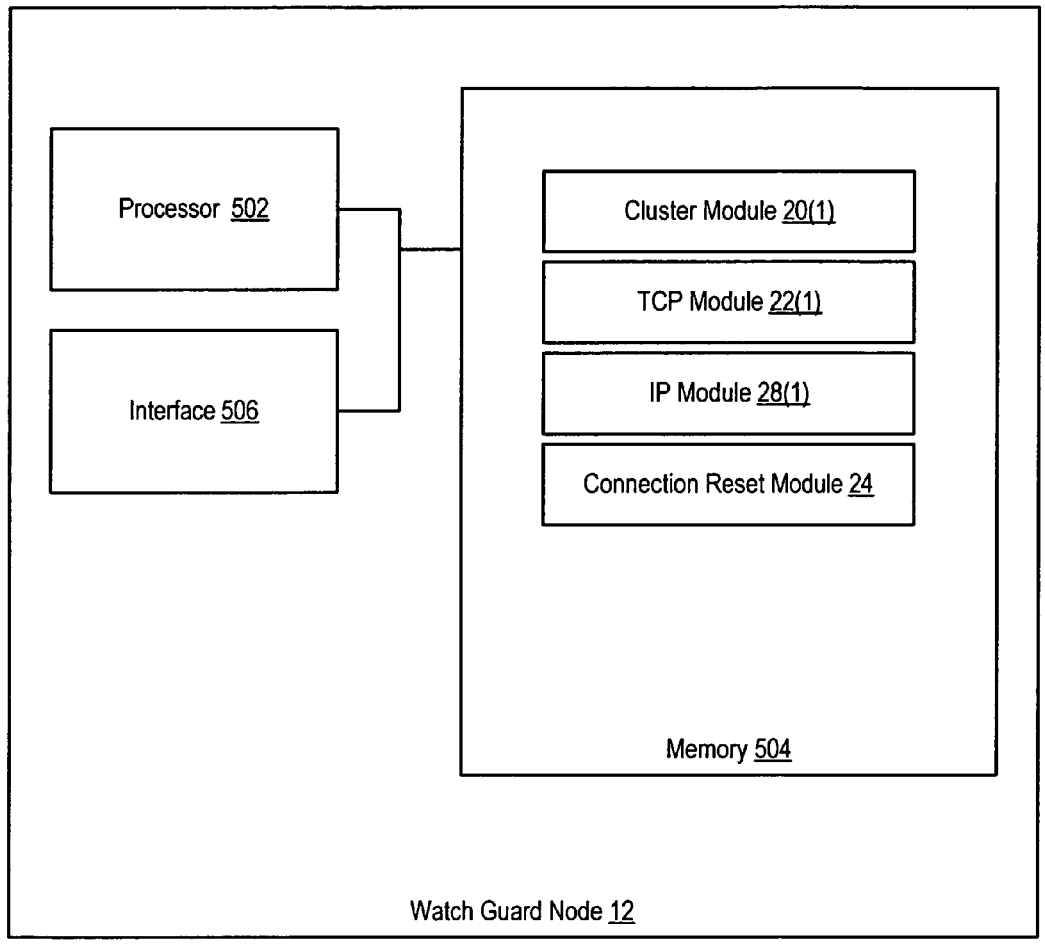
FIG. 5 is a block diagram of a node, according to one embodiment of the present invention.

FIG. 5 is a block diagram of a watch guard node 10 (e.g., as shown in FIG. 1). It is noted that other nodes, such as primary node 10 of FIG. 1, can be implemented in a similar manner. As illustrated, watch guard node 10 includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Watch guard node 10 also includes one or more interfaces 506. Processor 502, interface 506, and memory 504 are coupled to send and receive data and control signals by a bus or other interconnect.

Interface 506 can include a network interface to various networks and/or interfaces to various peripheral buses. Interface 506 can include an interface to one or more storage devices. Interface 506 can also include an interface to a backplane or other private communications network, for use in communicating with other nodes within the cluster (such an interface can be used by a cluster module 20(1) implemented on watch guard node 10).

In this example, program instructions executable to implement cluster module 20(1), TCP module 22(1), connection reset module 24, and IP module 28(1) are stored in memory 504. Connection reset module 24 can perform a method like the ones shown in FIGS. 2, 3, and 4.

The program instructions and data implementing connection reset module 24 can be stored on various computer readable media such as memory 504. In some embodiments, such software is stored on a computer readable medium such as a CD (Compact Disc), DVD (Digital Versatile Disc), hard disk, optical disk, tape device, floppy disk, and the like). In order to be executed by processor 502, the instructions and data implementing the connection reset module are loaded into memory 504 from the other computer readable medium. The instructions and/or data implementing the connection reset module can also be transferred to node 12 for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing a virtualization module are encoded, are conveyed.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   detecting a failed node within a cluster, wherein
      the failed node communicates with a client via a communication protocol connection;
   sending a communication protocol message to the client, in response to the detecting the failed node, wherein
      receipt of the communication protocol message causes the client to terminate the communication protocol connection,
      the detecting and the sending are performed by a node other than the failed node;
   obtaining a first parameter associated with the communication protocol connection, wherein
      the communication protocol message comprises a second parameter derived from the first parameter,
      the communication protocol connection is a Transmission Control Protocol (TCP) connection, and
      the obtaining the first parameter associated with the communication protocol connection is performed prior to detection of the failed node; and
   rewriting a message for transmission to the client, wherein the rewriting comprises:
      replacing a first media access control destination address, which identifies a watch guard node, with a second media access control destination address, which identifies a common gateway; and
      replacing a first protocol type with a second protocol type.

2. The method of claim 1, further comprising:
   receiving the message via the communication protocol connection; and extracting the first parameter from the message.

3. A system comprising:
   a watch guard node comprising:
      a cluster module, wherein
         the cluster module is configured to detect node failures within a cluster; and
      a connection reset module coupled to the cluster module; wherein
         the connection reset module is configured to initiate termination of a communication protocol connection to a primary node, if the cluster module detects that the primary node is failed, and
      the primary node, wherein
         the primary node is configured to send a communication protocol message to a client via the communication protocol connection,
         the communication protocol message comprises a destination address,
         the destination address identifies the watch guard node, and
         the connection reset module is configured to:
            extract a communication protocol connection parameter from the communication protocol message;
            rewrite the destination address to identify a common gateway; and
            send the communication protocol message to the common gateway.

4. A computer readable storage medium comprising program instructions executable to:
   detect a failed node within a cluster;
   send a communication protocol message to a client, in response to the detecting the failed node, wherein
      receipt of the communication protocol message causes the client to end a communication protocol connection to the primary node, and
      the communication protocol message is sent from a node other than the failed node;
   obtain a first parameter associated with the communication protocol connection, wherein
      the communication protocol message comprises a second parameter derived from the first parameter, and
      the communication protocol connection is a Transmission Control Protocol (TCP) connection;
   initiate failover of an Internet Protocol (IP) address from the failed node to a watch guard node;
   send a communication protocol probe from the watch guard node to the client, wherein the communication protocol probe queries the client for current connection parameters; and
   extract the first parameter from a probe response sent by the client.

5. A system comprising:
   means for detecting a failed node within a cluster;
   means for sending a communication protocol message to a client, in response to the detecting the failed node, wherein
      receipt of the communication protocol message causes the client to terminate a communication protocol connection to the failed node, and
      the communication protocol message is sent from a node other than the failed node;
   means for obtaining a first parameter associated with the communication protocol connection, wherein
      the communication protocol message comprises a second parameter derived from the first parameter,
      the communication protocol connection is a Transmission Control Protocol (TCP) connection, and
      the obtaining the first parameter associated with the communication protocol connection is performed prior to detection of the failed node; and
   means for rewriting a message for transmission to the client, wherein the means for rewriting comprises:
      means for replacing a first media access control destination address, which identifies a watch guard node, with a second media access control destination address, which identifies a common gateway; and
      means for replacing a first protocol type with a second protocol type.

6. A method comprising:
   detecting a failed node within a cluster, wherein
      the failed node communicates with a client via a communication protocol connection;
   sending a communication protocol message to the client, in response to the detecting the failed node, wherein
      receipt of the communication protocol message causes the client to terminate the communication protocol connection,
      the detecting and the sending are performed by a node other than the failed node;
   obtaining a first parameter associated with the communication protocol connection, wherein
      the communication protocol message comprises a second parameter derived from the first parameter, the communication protocol connection is a Transmission Control Protocol (TCP) connection, and
the obtaining the first parameter comprises:
   failing over an Internet Protocol (IP) address from the failed node to a watch guard node,
   sending a communication protocol probe from the watch guard node to the client, wherein the communication protocol probe queries the client for current connection parameters, and
   extracting the first parameter from a probe response sent by the client.

7. The method of claim 6, wherein the obtaining the first parameter associated with the communication protocol connection is performed in response to the detecting the failed node.

* * * * *